US006967828B2

(12) United States Patent
Miltich et al.

(10) Patent No.: US 6,967,828 B2
(45) Date of Patent: Nov. 22, 2005

(54) CAPACITORS INCLUDING METALIZED SEPARATORS

(75) Inventors: Thomas P. Miltich, Otsego, MN (US); Anthony Rorvick, Champlin, MN (US); John Norton, New Brighton, MN (US)

(73) Assignee: Medtronic, Inc., Minneapolis, MN (US)

( * ) Notice: Subject to any disclaimer, the term of this patent is extended or adjusted under 35 U.S.C. 154(b) by 0 days.

(21) Appl. No.: 10/618,467

(22) Filed: Jul. 11, 2003

(65) Prior Publication Data

US 2004/0240155 A1 Dec. 2, 2004

Related U.S. Application Data

(60) Provisional application No. 60/474,800, filed on May 30, 2003.

(51) Int. Cl.[7] .................... H01G 9/04; H01G 9/145
(52) U.S. Cl. .................... 361/508; 361/516
(58) Field of Search .................... 361/502, 503–522, 361/523–541

(56) References Cited

U.S. PATENT DOCUMENTS

| | | | |
|---|---|---|---|
| 3,303,805 A | 2/1967 | Steiner | |
| 3,493,751 A | 2/1970 | Davies et al. | |
| 3,612,871 A | 10/1971 | Crawford et al. | |
| 3,634,736 A * | 1/1972 | Boos et al. | 361/502 |
| 3,661,645 A | 5/1972 | Strier et al. | |
| 3,662,178 A | 5/1972 | Caputi et al. | |
| 3,673,017 A | 6/1972 | Peterson | |
| 3,677,844 A | 7/1972 | Fleischer et al. | |
| 3,713,921 A | 1/1973 | Fleischer et al. | |
| 3,802,972 A | 4/1974 | Fleischer et al. | |
| 3,852,134 A | 12/1974 | Bean | |
| 3,883,784 A | 5/1975 | Peck et al. | |
| 4,323,950 A * | 4/1982 | Bernard | 361/516 |
| 4,470,097 A | 9/1984 | Lavene | |
| 4,480,290 A | 10/1984 | Constanti et al. | |
| 4,593,343 A | 6/1986 | Ross | |
| 4,633,373 A | 12/1986 | Phillips | |
| 4,830,940 A | 5/1989 | Keister et al. | |
| 4,855,049 A | 8/1989 | Toulemonde et al. | |
| 4,876,451 A | 10/1989 | Ikeda et al. | |
| 4,942,501 A | 7/1990 | MacFarlane et al. | |
| 4,956,219 A | 9/1990 | Legras et al. | |
| 5,131,388 A | 7/1992 | Pless et al. | |
| 5,139,624 A | 8/1992 | Searson et al. | |
| 5,146,391 A | 9/1992 | MacFarlane et al. | |
| 5,153,820 A | 10/1992 | MacFarlane et al. | |
| 5,157,586 A | 10/1992 | Lallemand | |
| 5,415,959 A | 5/1995 | Pyszczek et al. | |
| 5,449,917 A | 9/1995 | Clements | |
| 5,568,353 A * | 10/1996 | Bai et al. | 361/523 |
| 5,584,890 A | 12/1996 | MacFarlane et al. | |
| 5,628,801 A | 5/1997 | MacFarlane et al. | |

(Continued)

FOREIGN PATENT DOCUMENTS

JP 04-240708 * 8/1992 ............ H01G 9/00

(Continued)

Primary Examiner—Eric W. Thomas
(74) Attorney, Agent, or Firm—Girma Wolde-Michael; Carol F. Barry; Paul H. McDowall (57) ABSTRACT

This invention relates generally to capacitor cells and the utilization of enhanced metalized separators in such cells. The metalized separators of the present invention generally include a separator base material, such as a Kraft paper, track etched material, or a microporous polymeric sheet, that supports a cathode and/or anode film operably adjoined to one or both surfaces.

20 Claims, 6 Drawing Sheets

U.S. PATENT DOCUMENTS

| | | | |
|---|---|---|---|
| 5,754,394 A | * 5/1998 | Evans et al. | 361/516 |
| 5,914,150 A | 6/1999 | Porter et al. | |
| 6,006,133 A | 12/1999 | Lessar et al. | |
| 6,048,607 A | 4/2000 | Hashimoto et al. | |
| 6,058,006 A | 5/2000 | Yoshioka et al. | |
| 6,127,042 A | 10/2000 | Tamic | |
| 6,210,875 B1 | 4/2001 | Patterson et al. | |
| 6,275,729 B1 | 8/2001 | O'Phelan et al. | |
| 6,426,863 B1 | 7/2002 | Munshi | |

FOREIGN PATENT DOCUMENTS

| | | | | |
|---|---|---|---|---|
| JP | 10-163059 | * | 6/1998 | H01G 2/18 |

* cited by examiner

CAPACITORS INCLUDING METALIZED SEPARATORS

CROSS REFERENCE TO RELATED APPLICATION

This patent disclosure claims the benefit of prior provisional U.S. patent application Ser. No. 60/474,800, invented by Norton et al., filed 30 May 2003, and entitled, "Capacitor Cells Including Enhanced Separator Systems and Materials"—the contents of which are hereby incorporated herein.

FIELD OF THE INVENTION

This invention relates generally to capacitor cells and the utilization of enhanced metalized separators in such cells. The metalized separators of the present invention generally include a separator base material, such as a Kraft paper, track etched material, or a microporous polymeric sheet, that supports a cathode and/or anode film operably adjoined to one or both surfaces.

BACKGROUND OF THE INVENTION

A capacitor cell typically comprises an anode coated with dielectric, a separator, a cathode, and an electrolyte solution. The anode and cathode are both generally formed foils, and serve as the source of positive and negative charge, respectively. The energy of a capacitor cell is stored in the electromagnetic field generated by opposing electrical charges separated by the dielectric layer disposed on the surface of the anode. Etching may be used to increase the surface area of the anode, as the energy stored by the cell is proportional to the surface area of the anode. A dielectric oxide layer is formed on the anode when a voltage is applied in an electrolytic solution. The dielectric layer insulates the anode from the cathodic electrolytic solution, allowing charge to accumulate. The separator holds the anode and cathode foils apart to maintain charge and prevent short-circuiting. In one embodiment, the anode/separator/cathode laminate is typically rolled up to form a cylindrical body and encased, with the aid of suitable insulation, in an aluminum tube that is subsequently sealed with rubber material. In such embodiments it is imperative that the cathode foil and anode foil be precisely positioned opposite each other on the separator material. Such precise positioning of the anode and/or cathode on the separator material can be a difficult task to consistently achieve.

An alternative design, commonly used in implantable cardioverter-defibrillators (ICDs), typically comprise either flat electrolytic capacitor (FEC) cells or pressed, sintered and formed, powdered metal capacitors—presently available with a single tantalum anode member. These capacitors have been developed that overcome some disadvantages inherent in commercial cylindrical capacitors. For example, U.S. Pat. No. 5,131,388 to Pless et. al. discloses a relatively volumetrically efficient flat capacitor having a plurality of planar layers arranged in a stack. Each layer contains an anode layer, a cathode layer and means for separating the anode layers and cathode layers (such as paper). The anode layers and the cathode layers are generally comprised of foil plates of anode or cathode material and are usually electrically connected in parallel. In a paper "High Energy Density Capacitors for Implantable Defibrillators" presented at CARTS 96: 16 th Capacitor and Resistor Technology Symposium, Mar. 11–15, 1996, several improvements in the design of flat aluminum electrolytic capacitors are described, such as the use of an embedded anode layer tab and solid adhesive electrolyte. Further advances in flat electrolytic capacitors are found in U.S. Pat. 6,006,133, issued to Lessar et al., the disclosure of which is incorporated herein by reference.

For either flat or cylindrical capacitor cells, it is necessary that the anode and cathode remain separated. A minimum separation between the anode and cathode must be maintained to prevent arcing between the anode and cathode, and to allow charge to accumulate without short-circuiting. In cylindrical cells, the anode and cathode foils are aligned precisely with a separator positioned between them and coiled tightly to prevent movement of the anode, cathode and separator during subsequent processing and use. Spacing is typically maintained at the electrode edges as well by providing separator overhang at the top and bottom of the anode and cathode winding, to prevent short-circuiting to the casing. In flat capacitor cells, anode to cathode alignment is typically maintained through the use of internal alignment posts or screws (as described, for example, in U.S. Pat. No. 6,006,133 to Lessar et al.). Alignment of the anode and cathode plates in flat capacitor cells again can be somewhat problematic in that the plates are generally small and difficult to maneuver and maintain in position during assembly of the capacitor cell.

Maintaining a proper distance between capacitor components is thus one of the prime functions of a separator. A separator must be resistant to degradation, have sufficient thickness to maintain inter-electrode separation without interfering with cell high performance, and exhibit sufficient surface energy such that electrolyte wettability and absorption are augmented. The separator must also have an electrical resistivity sufficiently high to prohibit short circuit current from flowing directly between the electrodes through the separator. These requirements are balanced by the need for the separator to have porosity sufficient to maintain electrode separation while allowing ionic transfer to occur unimpeded within the electrolyte during discharge. Additionally, the separator must have sufficiently strong tensile properties to facilitate cell fabrication and to withstand internal cell stresses due to changes in electrode volume during discharge and re-charging cycles.

Separators are generally made from a roll or sheet of separator material, and a variety of separator materials have been found to be effective. Paper, particularly Kraft paper, is a cellulose-based separator material that is commonly used. Cellulose separator materials are manufactured with high chemical purity. The total thickness of cellulose separators employed between anode and cathode plates will vary with the voltage rating of the capacitor structure and the type of electrolyte employed but, on the average, the thickness varies from 0.003" to 0.008" in connection with capacitors rated at from 6 volts to 600 volts respectively.

A common alternative to paper separators are polymeric separators. Generally, polymeric separators are either made of microporous films or polymeric fabric. An example of a microporous film separator is a separator comprising polytetrafluoroethylene, disclosed in U.S. Pat. No. 3,661,645 to Strier et al. U.S. Pat. No. 5,415,959 to Pyszeczek et al., on the other hand, describes the use of woven synthetic halogenated polymers as capacitor separators. The use of "hybrid" separators comprising polymer and paper material has also been described. See, for example, U.S. Pat. No. 4,480,290 to Constanti et al., which describes the use of separators including a porous polymer film made from polypropylene or polyester and absorbent paper.

In the assembly of an FEC capacitor, it is important to maintain alignment of the anode, cathode, and separator components. Failure in either aspect can lead to short-circuiting or inefficient capacitor performance. In cylindrical capacitors, proper spacing is typically maintained at the electrode edges or peripheries by providing separator overhang at the top and bottom of the anode and cathode winding, which results in a larger capacitor than would otherwise be necessary. In addition, the anode and cathode are precisely aligned and coiled tightly by a winding machine to prevent movement of the anode, cathode, and separator during subsequent processing and use. In flat capacitors, anode to cathode alignment is typically maintained through the use of internal alignment posts. Build-up of static charge in the separator material during manufacture of the capacitor can made handling of the material particularly troublesome. All of these techniques have the disadvantage or requiring extra machinery or capacitor components that would not otherwise be required, among others. In the case of pressed, sintered and formed powdered metal capacitors, the alignment issues are not as great as with FEC cells, but the other desirable qualities for improved separator materials are still present.

It would thus be desirable to find a means to reliably and efficiently attach separator material to the electrodes of an electrolytic capacitor to reduce production costs and the likelihood of capacitor malfunction.

SUMMARY OF THE INVENTION

The present invention generally relates to a capacitor cell comprising a sealable cell enclosure, one or more metalized separators disposed within the enclosure and an electrolyte also disposed within the enclosure. The metalized separators include a separator base partially or wholly coated with one or more anode or cathode films. The separator base can be made of any suitable material including, but not limited to, nonwoven polymers, microporous polymers, track etched materials and papers. Additionally, in various embodiments of the present invention, the cathode film may comprise a metal, such as ruthenium, vanadium, copper, silver, chromium, bismuth, lead, tantalum, titanium, zinc, iron, niobium, zirconium, carbon, manganese and alloys and oxides thereof. Similarly, the anode film may comprise a metal such as lithium, aluminum, sodium, potassium, calcium, magnesium, vanadium, tantalum, niobium, and alloys and oxides thereof. The electrolyte is normally added to the capacitor cell to activate the anode film, cathode film or both films.

The capacitor cell of the present invention may be formed into a variety of configurations such as cylindrical cells, flat cells (i.e., FEC cells) and a single powdered metal anode slug adjacent cathodic material. In various embodiments of the present invention cylindrical cells are formed by winding elongated sheets of separator material including a cathode film on one side of the sheet and an anode film on the opposite side of the sheet. Alternatively, a flat cell may be formed by folding a similar elongated metalized separator sheet in a z-fold configuration. Additionally, other flat cell embodiments of the present invention may be formed by utilizing separators that include cathode and anode sectors or that include stacked separator segments.

In various embodiments of the present invention, the capacitor cell may be formed by applying a film of cathode material or anode material to a first surface of one or more separator bases, thereby forming one or more metalized separators. Other embodiments include cathode and anode sectors that may be formed on a separator base by applying metal films through a shield. Next, a layer system of alternating cathodes and anodes is formed wherein the alternating cathodes and anodes are separated by one or more separator bases. One embodiment of the present invention includes a plurality of separator segments that support cathode or anode films to form the layer system. Once the alternating cathode/anode layer system is formed, the layer system is placed into a cell enclosure. The cell enclosure is then filled with an electrolyte to activate the cathode and anode. Finally, the enclosure is sealed to retain and maintain the layer system and electrolyte within the enclosure.

The foregoing and additional advantages and characterizing features of the present invention will become increasingly apparent to those of ordinary skill in the art by references to the following detailed description and to the drawings.

BRIEF DESCRIPTION OF THE DRAWINGS

The above and other objects and aspects of the invention will be apparent from the description of embodiments illustrated by the following accompanying drawings.

DETAILED DESCRIPTION OF THE INVENTION

The present invention is related to a capacitor cell having separator materials that include a separator base material and a cathode film and/or anode film operably adjoined to one or both surfaces of the base material. Metalized separators have been found to serve as excellent separators in capacitor cells and are desirable since they are sufficiently thin, have strong tensile properties, are adequately flexible, provide precise positioning of anodes and cathodes during cell assembly and reduce the occurrence of arcing within the capacitor system.

Figure 1:
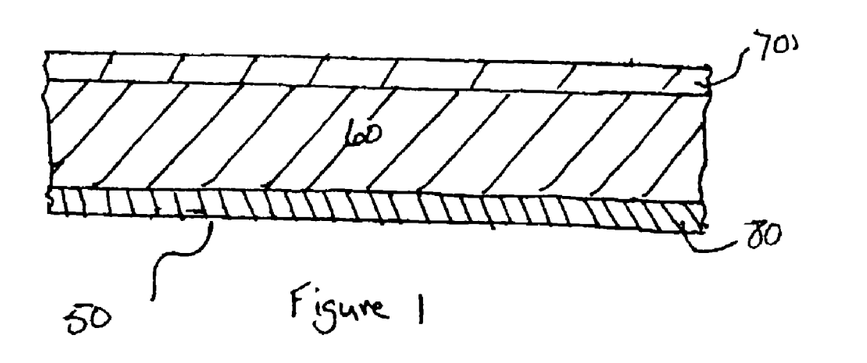
FIG. 1 depicts a partial cut-away side view of a metalized separator including a cathode film and an anode film administered to a separator base.

Additionally, metalized separators combine multiple capacitor cell components into a single unitary structure thereby simplifying the assembly of such cells. For example, FIG. 1 depicts one embodiment of the present invention wherein a metalized separator 50 is depicted including a separator base 60, which supports a cathode film 70 on one surface of the separator base 60 and an anode film 80 on the opposite surface of the separator base 60. The cathode/anode double sided separator 50 thereby eliminates the need to precisely position and possibly adhere cathode and anode plates or foils on the separator material during assembly.

Figure 2:
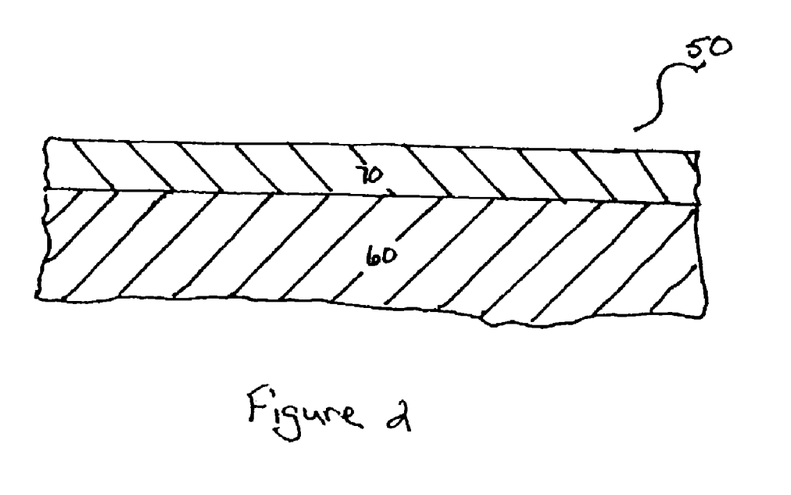
FIG. 2 depicts a partial cut-away side view of a metalized separator including a single metal film.

FIG. 2 depicts another embodiment of the present invention wherein a metalized separator 50 is depicted including a separator base 60 of a known separator material that supports only a cathode film 70 in a single unitary structure. The metalized separator 50 of this embodiment generally, eliminates the need to position and possibly adhere a foil cathode plate to the separator material 70. In such an embodiment anode plates or foil (not shown) are positioned on the other side of the separator material 60 opposite the cathode film when forming the capacitor cell. It is noted that an anode film may be applied to the separator material rather than a cathode film when producing a separator with a single film. In such an embodiment, cathode plates would be utilized in cooperation with the anodic metalized separator. It is noted that in either of these embodiments the cathode or anode film may be sealed in a separator envelope thereby separating the film from the adjacent anode or cathode foil plate. The separator envelope may simply include another separator base (not shown) positioned over either the cathode film or anode film and optionally adhered to the separator base 60 positioned below either film. These previously described embodiments of the present invention allow for ease in manufacture and assembly of capacitor cells and contribute to the reduction of malfunction of the cell.

The separator base 60 may be produced from any suitable material including but not limited to 1) nonwoven polymers, such as polyesters, polystyrenes, aromatic polyesters, polycarbonates, polyolefins, including polyethylene, polyethylene terephthalate, polypropylene, vinyl plastics such as polyvinyl difluoride (PVDF), and cellulose esters such as cellulose nitrate, cellulose butyrate and cellulose acetate; 2) microporous polymers such as polytetrafluoroethylene (PTFE); 3) track etch materials (track etched materials are explained further in the following paragraphs); and papers, such as Kraft paper (cellulose) or Manila paper.

The process of making track etched materials is well known in the art and many variations of the process exist. Examples of processes for forming track etched membranes are disclosed in U.S. Pat. Nos. 3,303,805; 3,493,751; 3,612,871; 6,120,875; 3,662,178; 3,673,017; 3,677,844; 3,713,921; 3,802,972; 3,852,134; 4,855,049; 4,956,219; 5,139,624; 5,449,917; 5,914,150, the entire contents of each of which are incorporated herein by reference. The present separator can be comprised of any material that has been track etched according to any of the processes disclosed in the references above or according to any known track etching process.

While the material that is track etched can be any known material that is capable of being track etched, in preferred embodiments, the separator material comprises a polymeric material. Polymeric materials include but are not limited to polyesters, polystyrenes, aromatic polyesters, polycarbonates, polyolefins, including polyethylene, polyethylene terephthalate, polypropylene, vinyl plastics such as polyvinyl difluoride (PVDF), and cellulose esters such as cellulose nitrate, cellulose butyrate and cellulose acetate. In particularly preferred embodiments, the material comprises a polycarbonate material. Polycarbonate materials are preferred because they have outstanding impact resistance and toughness. They also have high tensile and structural strength.

Commercial polycarbonate materials are produced in various countries and are sold under the trade names LEXAN, MERLON, MAKRAYLON, JUPILON, and PANLITE. Additionally, commercially available track-etched membranes include but are not limited to NUCLEPORE® and CYCLOPORE™ distributed by WhatMan, Inc. located in Newton, Mass., ISOPORE™ distributed by Millipore, Inc. located in Billerica, Mass., PORETICS® and MEMTREX™ distributed by Osmonics located in Minnetonka, Minn., and SPI-Pore™ distributed by Structure Probe, Inc. located in West Chester, Pa.

In one preferred embodiment, the separator base 60 is a pure cellulose, very low halide or chloride content Kraft paper having a thickness of about 0.0005 inches, a density of about 1.06 grams/cm.sup.3, a dielectric strength of 1,400 ac Volts per 0.001 inches thickness, and a low number of conducting paths (about $0.4/ft^2$ or less). When including either anode foil plates or cathode foil plates in conjunction with separator bases 60 that include films, the separator bases 60 are preferably cut slightly larger than the foil plates to accommodate misalignment during the stacking of metalized separators and foil plates and to prevent subsequent shorting between electrodes of opposite polarity.

Additionally, the separator base 60 has a thickness suitable for use in a capacitor cell similar to separators known in the art. The range of thicknesses of a separator base 60 typically available for utilization in capacitor cells of the present invention is approximately 250 microns or less and preferably between 5–250 microns (or approximately 0.0002–0.01 inches), most preferably 10–50 microns. Optimally, the separator base 60 is thin enough to avoid the swelling or crowding seen with prior separator materials such as kraft paper.

It is preferred that separator bases 60 be formed of a material that: (a) is chemically inert; (b) is chemically compatible with the selected electrolyte; (c) may be impregnated with the electrolyte to produce a low resistance path between adjoining anode and cathode layers, and (d) physically separates adjoining anode and cathode layers. Separator bases 60 may also be formed of materials other than Kraft paper, such as Manila paper, porous polymeric materials or fabric gauze materials. For example, porous polymeric materials may be disposed between anode and cathode layers of like those disclosed in U.S. Pat. Nos. 3,555,369 and 3,883,784 in some embodiments of the present invention.

As previously suggested the metalized separators 50 of the present invention also include a cathode film 70 and/or an anode film 80. The cathode and/or anode films 70, 80 applied to one or both surfaces of the separator base 60 may include any cathode or anode material known in the art. It is generally preferred that the specific capacitance of the cathode film be as high as possible, and that cathode layer be as thin as possible. For example, the cathode material may include materials such as ruthenium, vanadium, copper, silver, chromium, bismuth, lead, tantalum, titanium, zinc, iron, niobium, zirconium, carbon, manganese or similar alloys or combinations. These types of cathode materials of a conductive metal may be provided with a semiconductive or pseudocapacitive coating. The coating may be an oxide, nitride, carbide or carbon nitride. Likewise, in many embodiment of the present invention, the cathode film generally comprises a comparatively flexible, high purity cathode material of about 5–150 microns (approximately 0.0001–0.006 inches) thick, preferably 25–100 microns (approximately 0.001–0.004 inches) thick and most preferably about 25–40 microns. Some preferred parameters of cathode films have been discovered to include high surface area (i.e., highly etched cathode foil) and high specific capacitance (preferably at least 200 microfarads/cm$^2$, and at least 250 microfarads/cm$^2$ when fresh).

Additionally, the anodic material usually comprise metals selected from Groups IA, IIA and IIIB of the Periodic Table of Elements. For example, these anodic materials include but are not limited to lithium, aluminum, sodium, potassium, calcium, magnesium, vanadium, tantalum, niobium, or their alloys, or any alkali metal or alkali-earth metal capable of functioning as an anode. Additionally, lithium-silicon, lithium-aluminum, lithium-boron, and lithium-silicon-boron alloys may serve as the anode material. Thin anode films are preferred in the present invention, especially if they substantially maintain or increase specific capacitance while reducing the thickness of electrode assembly, or maintain the thickness of electrode assembly while increasing overall capacitance. Typically, the anode films are between about 50–250 microns (approximately 0.01 to about 0.003 inches) thick. For example, in certain embodiments, each anode film 80 comprises an anode film of about 75–200 microns thick, preferably 90–125 microns. Anode layers are formed of the anode foil. It has been discovered that the anode film most preferably has a high specific capacitance (at least about 0.2, at least about 0.5 or most preferably at least about 0.8 microfarads/cm$^2$), and has a dielectric withstand parameter of at least 350 Volts DC.

The anode and/or cathode material(s) are applied to the paper to function as the cathode or anode and should be administered to the separator base 60 in a manner such that the separator base substantially maintains its flexible characteristics. Unlike the adherence of anode or cathode electrode plates to the separator by means such as adhesives or heat welding, the metalized separators utilized in embodiments of the present invention may be bent or folded, thereby allowing for continuous elongated separator sheets that may be folded when forming a capacitor cell. For example, a metalized separator utilized in an embodiment of the present invention may be folded in a z-fold configuration thereby allowing for the application of only a single separator sheet in a capacitor cell. It is noted that the metalized separator may also be cut to provide multiple sheets for a single capacitor cell. A better explanation of these embodiments will be described below.

Applying the cathode film 70 and/or anode film 80 to the separator base 60 may be performed by a number of suitable methods. For example, anode or cathode materials may be administered to the separator base 60 by methods such as magnetron sputtering, plasma spraying, brush coating, spray administration (spray painting), pyrolytic deposition, chemical vapor deposition or physical vapor deposition. An example of a sputtered metalized separator is a metalized paper commercially available through SPO (a German company: Specialpapierfabrique Oberschmitten). The metalized paper produced by SPO comprises a Kraft paper utilized as a base material, which supports a thin layer of magnetron sputtered aluminum on one or both sides of the paper. Of course, other desired materials may be sputtered or otherwise applied to said base material.

An additional metal administration technique may be to coat a polymer solution or partially polymerized polymeric separator material with a particulate metal to form a cathode film 70 and/or an anode film 80 on a separator base 60. For example, a liquid polymer or partially polymerized polymer, such as polyethylene or partially polymerized polymer may be applied to a surface, such as a conveyor or table top, and subjected to uniform coating of the exterior with particulate metal material. Uniform coating of the surface may be performed by a shaking, spraying or sieving of the particulate metal over the polymer coated surface until the surface of the polymer is completely and uniformly covered. The metal material partially embeds into the surface of the polymer and is secured upon complete polymerization of the polymeric material. Alternatively, the metal particles may be solvent welded to a separator sheet by simply coating the separator sheet with a liquid polymer material and applying the particles before the polymer completely polymerizes. The complete polymerization of the polymeric material thereby forms a metalized separator 50 with an cathode film 70 or anode film 80. The opposite surface of the separator base 60 from the applied anode or cathode material may be solvent welded with additional polymeric material to prevent complete penetration of the separator base 60 by the metal material. Finally, additional anode or cathode material may be applied to the opposite surface of the separator base 60 by simply turning over the sheet of metalized separator material and performing the same above described process.

It is noted that the anode film 80 may be further processed by etching and/or forming procedures to create a high capacitance per unit area. Typically, the capacity of an electrolytic capacitor is determined by the area of the anode surfaces and the thickness of the dielectric film covering this surface. As a result, an increase in capacity can be obtained if the surface area of the anode layer is increased. A number of methods have been developed for increasing the surface area of an anode layer. Such methods include but are not limited to sand blasting, mechanical embossing, scratching with rotating brushes, use of abrasive materials, forming in rotary dies, and chemical etching. Each of these methods are well known in the art and any method can be used to increase the surface area of the anode layer. Preferably, a chemical etching procedure is used. Optimally, etching dissolves portions of the metal to create a dense network of billions of microscopic tunnels penetrating through the film.

While the above described metalized separator can be used with any capacitor cell such as a battery or capacitor, the separator will now be described in terms of its use in an electrolytic capacitor. An electrolytic capacitor typically includes an anode, a separator, and a cathode all submerged in an electrolyte solution. As previously described, the anode and/or cathode may be films applied directly to the separator base 60, and serve as the source of positive and negative ions, respectively. The separator base 60 holds the anodes and cathodes apart to prevent short circuiting. The electrolyte solution interacts with the anode to form a dielectric oxide layer thereon. This dielectric oxide layer serves to insulate the anode from the surrounding electrolyte solution, allowing for charge to accumulate. The energy of the capacitor is stored in the electromagnetic field generated by the opposing electrical charges separated by the dielectric layer disposed on the surface of the anode.

Furthermore, all of the capacitor materials, including the anode/separator/cathode assemblies, are typically sealed within an enclosure. The enclosure is preferably comprised of a corrosion-resistant metal such as stainless steel or titanium. Alternatively, in another embodiment the enclosure or casing is made of one or more film sheets of a heat-fusible synthetic resin, typical of which is polyethylene, polypropylene or laminates thereof. The film sheets have generally a thickness of 100–250 microns in order to impart satisfactory mechanical or other desirable properties to the enclosure. In one embodiment the element is enclosed by placing it between two sheets of resin film and bonding the sheets together along the entire periphery thereof by heat-sealing or other suitable techniques. Aside from the polypropylene films, polyethylene films and laminations thereof, other resin films may be used which are excellent in heat stability and solvent resistance and are thus free of formation of pinholes or cracks on application of heat. Such films include polyethyleneterephthalate film, polyimide film and various metal films such as Al, Zn or Sn.

In various embodiments the enclosure is filled with the liquid electrolyte. The liquid electrolyte is a very electrically conductive solution containing positive or negative ions. In the present capacitor, any electrolyte solution suitable for use with an electrolytic capacitor may be used. Preferably, the electrolyte contains either a glycerol or glycol, as these render the capacitors operative over a much increased temperature range. For example, in certain embodiments, the electrolyte solution contains ethylene glycol or tetraethylene glycol dimethyl ether ("tetraglyme").

It is generally understood that a liquid electrolyte saturates or wets the separator base 60 and is disposed within the case or enclosure. It is also to be understood, however, that various embodiments of the present invention include within their scope a solid or adhesive electrolyte such as those disclosed in U.S. Pat. Nos. 5,628,801; 5,584,890; 4,942,501 and its continuations, U.S. Pat. Nos. 5,146,391 and 5,153,820. Note that in some embodiments of the present invention, an appropriate inter-electrode adhesives/electrolyte layer may be employed in place of paper, gauze, track etched polymer or porous polymeric materials to form the separator base 60.

The electrolytic capacitor can be of any suitable configuration, for example a flat, cylindrical or arbitrarily-shaped pressed, sintered and formed powdered metal-type capacitor configuration. Cylindrical capacitors typically include an anode/separator/capacitor laminate rolled up to form a cylindrical body and encased within a tube and subsequently sealed. Flat capacitors typically include a plurality of anode/separator/capacitor layers arranged in a stacked configuration. For example, such flat capacitors are disclosed in U.S. Pat. No. 5,131,388 to Pless et. al. and in U.S. Pat. No. 6,006,133, the entire contents of each which are incorporated herein by reference. In preferred embodiments, the capacitor has a flat configuration. Flat capacitors are preferred because they are typically smaller in design than cylindrical capacitors. The configuration of the flat capacitor can be any flat configuration currently known in the art to be used in electrolytic capacitors.

Figure 3:
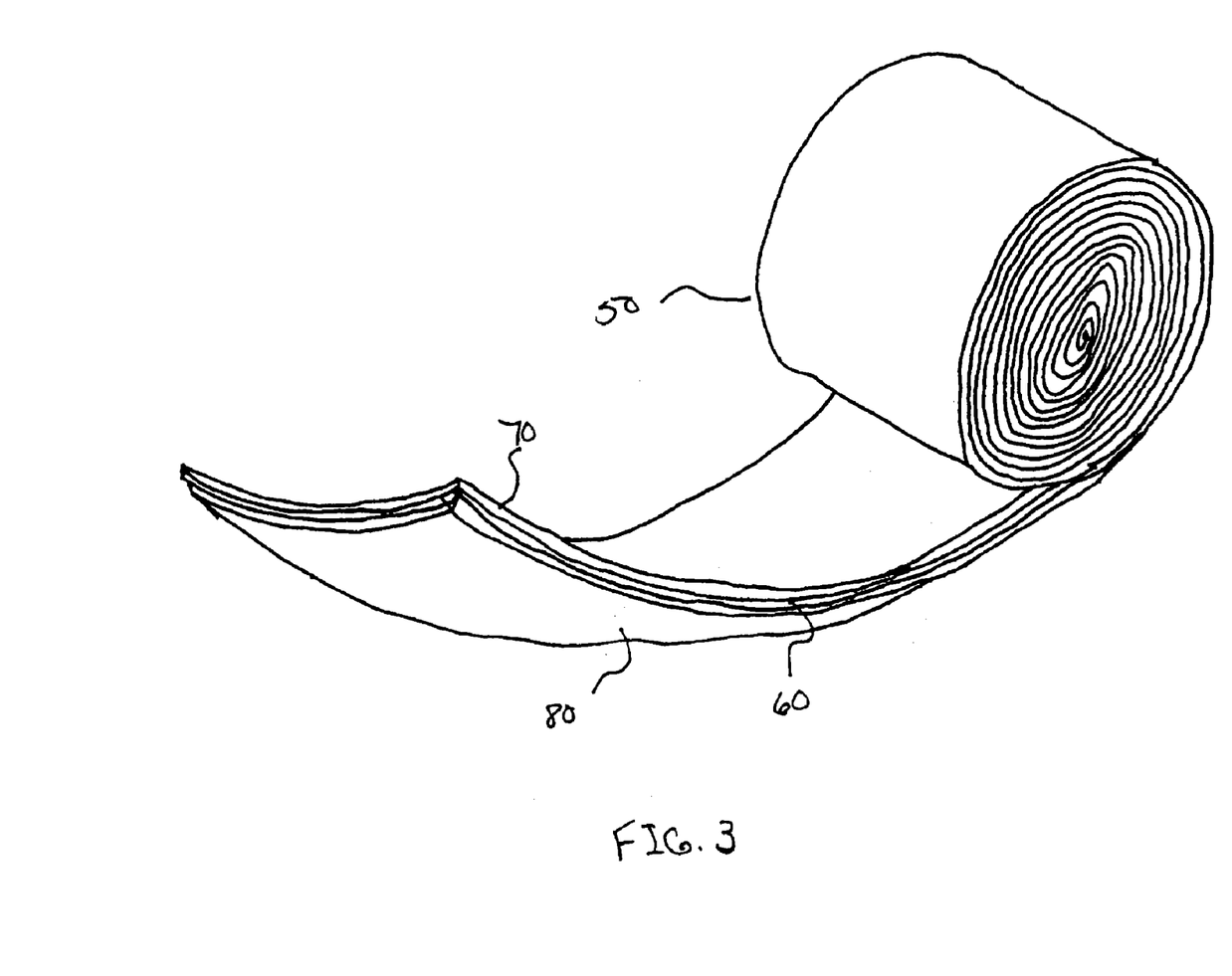
FIG. 3 depicts one embodiment of a metalized separator of the present invention that may be utilized in a cylindrical capacitor cell wherein the separator material is coated with an anode film on one side and a cathode film on the opposite side.

In all the metal administration methods disclosed above, the cathode and/or anode material may be applied uniformly over the entire separator base 60 or over strategically determined portions of the separator base 60. For example, FIG. 3 depicts a partially wound metalized separator 50 that may be utilized in a cylindrical capacitor. The metalized separator 50 of this embodiment includes a separator base 60 positioned between a cathode film 70 and an anode film 80. The cathode film 70 and anode film 80 may be administered to uniformly and completely coat the opposite sides of the separator base 60 utilizing any of the processes disclosed above.

Figure 4:
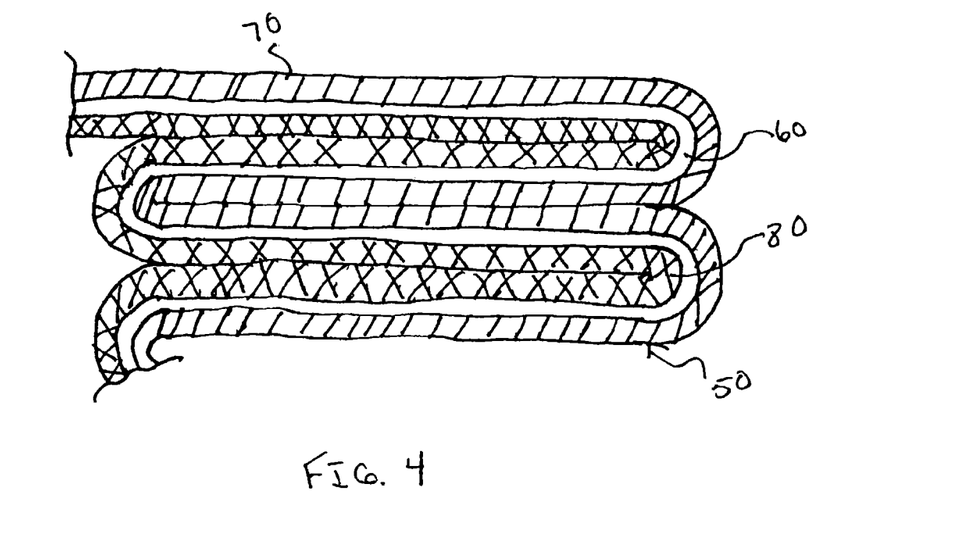
FIG. 4 depicts a top perspective view of an elongated metalized separator sheet maneuvered in a z-fold configuration including cathode and anode films positioned on opposite sides of a separator base.

In an alternative embodiment depicted in FIG. 4 a metalized separator 50 may be folded in a z-fold configuration and utilized in a flat capacitor. Similar to the cylindrical capacitor embodiment depicted in FIG. 3, the metalized separator 50 of FIG. 4 includes a separator base 60 positioned between a cathode film 70 and an anode film 80. Of course, a single-sided separator base 60 may be configured in an E-shaped configuration and a single opposing electrode plate inserted so that said opposing electrode plate is adjacent the base and insulated from the other electrode. As previously disclosed, the cathode film 70 and anode film 80 are administered to uniformly and completely coat the opposite sides of the separator base 60 utilizing any of the processes disclosed above. The metalized separator 50 of this embodiment is folded back and forth upon itself thereby alternating anode and cathode layers, which are separated by separator material.

Figure 5:
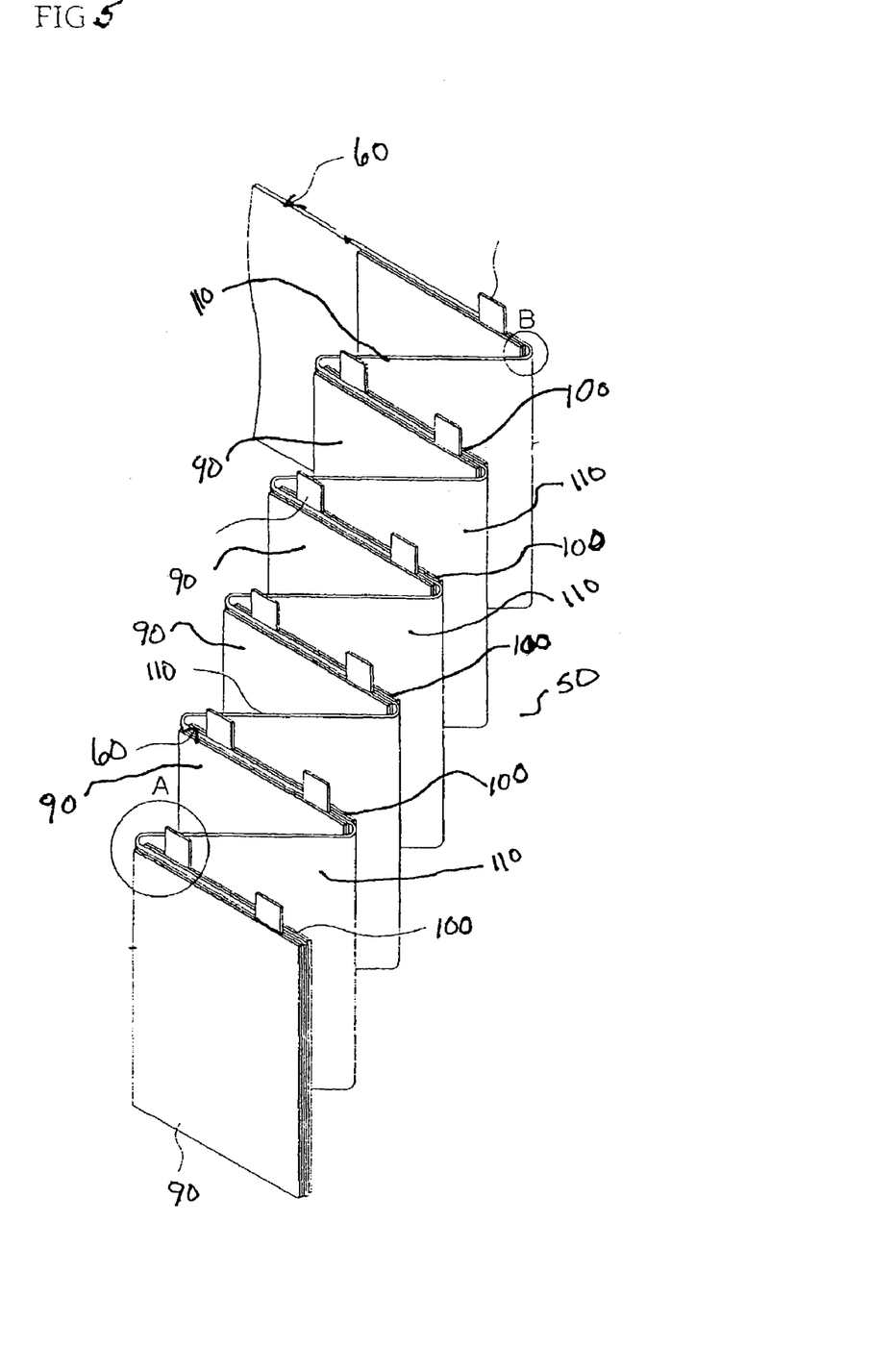
FIG. 5 depicts a side view of an elongated metalized separator sheet maneuvered in a z-fold configuration including cathode and anode film sectors positioned on opposite sides of a separator base.
Figure 6:
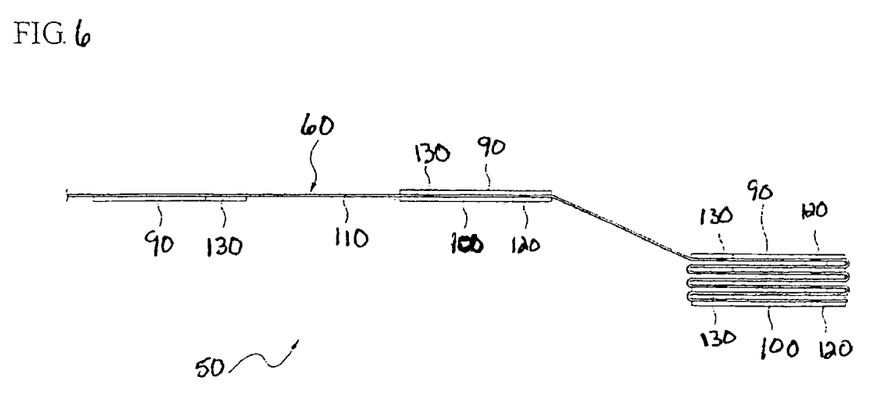
FIG. 6 depicts a side view of the elongated metalized separator of FIG. 5 maneuvered in a z-fold configuration including cathode and anode film sectors wherein a portion of the separator is shown in a collapsed position.

In other embodiments of the present invention, cathode and anode film sectors 90, 100 may be administered in strategic configurations on a separator base 60 to better facilitate the assembly of a capacitor cell. Generally, a cathode sector 90 is a section of the separator base 60 that includes a cathode film and an anode sector 100 is a section of a separator base 60 that includes an anode film. For example, FIGS. 5 and 6 depict an embodiment of the metalized separator 50 of the present invention wherein cathode sector 90 and anode sector 100 are strategically positioned on the separator base 60 to facilitate the assembly of a capacitor cell. The cell in this embodiment includes a single elongated sheet of metalized separator material. FIGS. 5 and 6 depict unfolded and partially folded embodiments of the present invention respectively wherein cathode and anode sectors 90, 100 are strategically positioned.

As previously suggested FIGS. 5 and 6 depict capacitor cells that are in partially folded and unfolded configurations, respectively. Generally, the folding feature of this embodiment comprises a metalized separator 50 that includes one or more separating sectors 110 and a plurality of cathode and anode film sectors 90, 100. Commonly, the cathode sectors 90 are positioned on one side of the separator base 60 and the anode sectors 100 are positioned on the separator film 60 opposite to the cathode sectors 90. A separating sector 110 is positioned between each pair of adjacent cathode and anode sectors 90, 100 and is generally of a width slightly larger than the width of one of the adjacent pairs of cathode and anode sectors 90, 100. The size or width of the separating sector 110 may vary depending on the size of the cathode and anode sectors 90, 100, but normally is of sufficient size to completely cover an adjacent cathode sector 90 and/or anode sector 100 when the separator film is folded to a collapsed position as depicted in FIG. 6. The capacitor cells of the present invention alternate cathode and anode sectors 90, 100 and physically separate them by alternating with each fold of the separator base 60 a separating sector 110 and either a cathode sector 90 or anode sector 100. It is noted that each anode may include an anode tab 120 and each cathode may include a cathode tab 130 that function as electrical connections, which pass through the enclosure or case to the outside.

Figure 7:
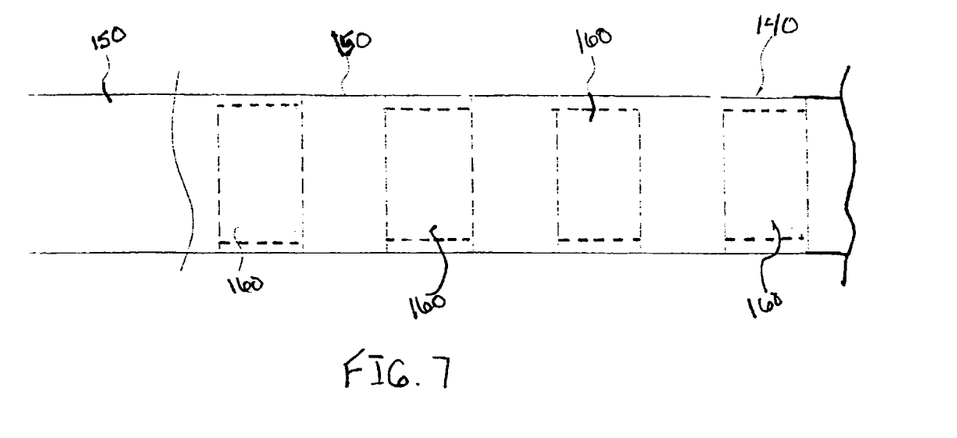
FIG. 7 depicts a top view of a screen, mask or shield utilized to apply cathode or anode film sectors to a separator base.

The cathode and/or anode film sectors 90 and 100 may be administered to an elongated separator base 60 by any of the methods described above. However, one method to ensure the positioning of each sector on the separator base 60 is to utilize a mask, screen or shield to protect the separator base portions that are intended to remain free of anode or cathode material. FIG. 7 depicts one embodiment of a screen or shield 140 utilized in the preparation of a metalized separator of the present invention. Generally, the shield 140 comprises an elongated member 150 that includes one or more apertures 160. The apertures 160 are positioned and sized on the elongated member 150 to facilitate the proper position and size of the cathode or anode sectors 90, 100 applied to a separator base (not shown). For example, a metalized separator formed by sputtering a cathode material on a separator base may be produced by positioning a shield 140 in a magnetron sputtering deposition chamber immediately over the separator base intended to be coated with anode or cathode material. Upon initiating the plasma the anode or cathode material is sputtered from a target thereby coating the separator base only in the area exposed by the apertures 160. Hence the elongated member 150 protects the other portions of the separator base from being coated with anode or cathode material. It is noted that the shield 140 may also be a mask that is positioned on the separator base and removed from the base upon completion of the coating process. It is further noted that any of the previously mentioned cathode and/or anode administration methods may incorporate a shield or masking 140 to obtain a metalized separator with cathode and/or anode sectors.

Figure 8:
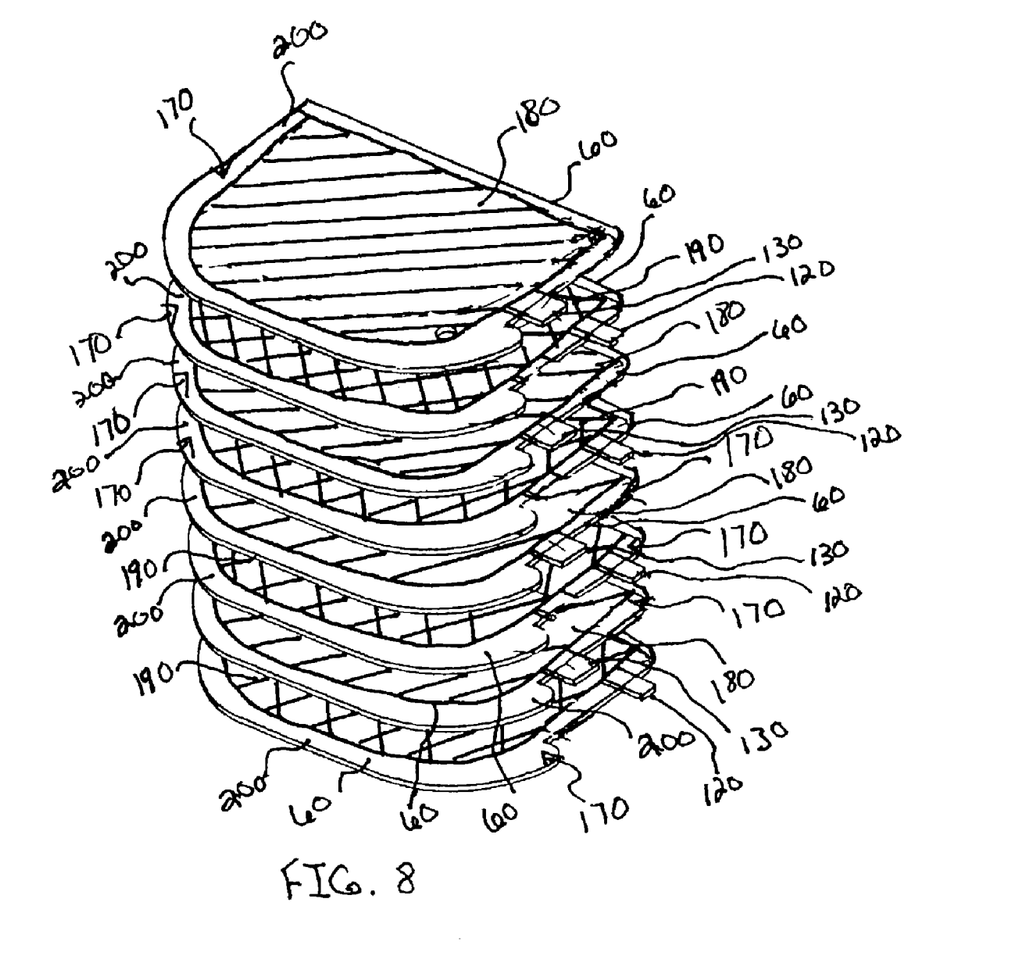
FIG. 8 depicts an exploded top perspective view of a capacitor cell formed in a flat construction including separator segments having alternating cathode and anode films.

Another embodiment of a capacitor cell of the present invention may include one or more separator segments. FIG. 8 depicts an exploded top perspective view of a stack configuration of separator segments 170 utilized in a capacitor cell of a flat construction. The capacitor cell design described herein employs a stacked configuration, wherein the anode/cathode sub-assembly comprises alternating substantially rectangularly-shaped separator segments 170 including a separator base 60, which supports a cathode film 180 or an anode film 190. In this embodiment of the present invention each separator segment 170 includes an apron 200 that does not include a anode or cathode film 180, 190. The apron 200 may provide for the sealing of each individual electrode in a separator envelope by adhering the aprons of adjacent separators with adhering means such as adhesive or heat. The separator segments 170 should be made at least slightly larger than the cathode and anode films 180, 190 to ensure that a physical barrier is disposed between the anodes and the cathodes of the finished capacitor cell. Each anode film 190 usually includes an anode tab 120 attached thereto, while each cathode film 180 preferably has cathode tab 130 formed integral thereto and projecting from the periphery thereof.

In certain embodiments comprising a flat configuration, the capacitor cell comprises a stacked configuration including separator segments 170 carrying alternating anode and cathode films 180, 190. The separator. segments 170 can have any suitable shape and/or size. The shapes of these layers are primarily a matter of design choice, and are dictated largely by the shape, size, or configuration of the case within which the layers are ultimately disposed. In certain embodiments, the stacked separator segments 170 have a substantially rectangular shape. In one embodiment of the present invention the separator segments 170 can be produced by administering the anode or cathode material to an elongated separator base through a shield or mask as described above. Upon application of the anode or cathode material the separator base may be cut into separator segments 170 utilizing any cutting or punching means known in the art. For example, a die apparatus including a punch and cavity, as disclosed in commonly owned U.S. Pat. No. 6,006,133 to Lessar et al, which is hereby incorporated by reference, may be employed in forming the separator segments 170. The die should be configured to produce segments 170 having a desired predetermined shape and size, such as those shown in FIG. 8. An advantage of the capacitor cell construction of the present invention is that anode and cathode films and their associated separator base may assume any arbitrary shape to optimize packaging efficiency.

Typically, the separator segments 170 including an anode film 190 are all connected in parallel to each other. Also, the separator segments 170 including a cathode film 180 are all connected in parallel to each other. The electrical connections from each the anode films 190 and cathode films 180 may pass through the enclosure to the outside. Where the electrical connections pass through the enclosure, they are sealed against fluid leakage by methods such as adhesive bonding, heat sealing or heat molding.

It will be understood by those skilled in the art, however, that the precise number of separator segments 170 selected for use in a given capacitor cell will depend upon the energy density, volume, voltage, current, energy output and other requirements of the device.

It is preferred in the present invention to cut or otherwise form separator segments 170 such that its outer periphery conforms closely to that of the corresponding sidewalls of the interior of case or enclosure. In preferred embodiments of the present invention, the periphery of separator layer is disposed within plus or minus 5–225 microns of the corresponding sidewalls of case or enclosure. Such close conformity between the periphery of separator segment 170 and the corresponding internal sidewalls of the case or enclosure has been discovered to provide the advantage of permitting separator segments 170 to immobilize or secure firmly in place in the case or enclosure. This immobilization may occur because some of the separator material forming separator segments 170 swell after electrolyte is added into the otherwise assembled and sealed capacitor cell.

In a preferred method of the present invention, metalized separators are drawn between the punch and cavity portions of a die having appropriate clearances on a roll. An air or hydraulically actuated press is then most preferably employed to actuate the punch or cavity portion of the die. The punch portion of the die is most preferably formed of hardened tool steel, or has other suitable wear resistant materials or coatings disposed on the cutting surfaces thereof. When the cavity of the die is aligned vertically, the punch portion of the die may travel either upwards or downwards towards the die cavity during a cutting cycle. In the former case, separator segments are cut and drop downwardly into a container for use in subsequent assembly operations. In the latter case, separator segments are cut and may be presented directly to automated assembly equipment, such as robots equipped with vacuum or other pick-up tooling, for subsequent processing. Low clearance dies of the type described herein may be supplied by Top Tool, Inc. of Minneapolis, Minn.

Continuing to refer to FIG. 8, the dies preferably utilized to cut to shape the components of the capacitor cells of the present invention have low wall-to-wall clearance, where inter-wall spacing between the substantially vertically-oriented corresponding walls of the punch and die is most preferably on the order of about 2–15 millionths of an inch per side. It has been found that the use of low clearance dies produces an edge superior to that of other cutting methods, such as steel rule dies. The shape, flexibility and speed of a low clearance die has been discovered to be superior to that of laser or blade cutting. However, other methods of cutting or forming metalized separator-segments 170 falling within the scope of the present invention include, but are not limited to, steel rule die cutting, laser cutting, water jet cutting and blade cutting.

Those of skill in the art-will recognize that many of the embodiments and techniques provided by the present invention may be used, as applicable, to electrically isolate electrodes of diverse electrochemical cells, such as primary and secondary battery cells. That is, the teaching of the present invention is not to be strictly limited to capacitor cells but should be fairly construed to include other types of electrochemical cells as set forth in the appended claims.

While the invention has been described in conjunction with specific embodiments thereof, it is evident that many alternatives, modifications, and variations will be apparent to those skilled in the art in light of the foregoing description.

Accordingly, the preceding disclosure is intended to embrace all such alternatives, modifications, and variations, which fall within the spirit and broad scope of the invention.

What is claimed is:

1. A capacitor cell comprising:
   a sealable cell enclosure;
   one or more metalized separators disposed within said enclosure, said separators including a separator base partially or wholly coated with one or more spaced-apart anode or cathode films; and
   an electrolyte also disposed within the enclosure that activates the anode film, cathode film or both films.

2. The capacitor cell of claim 1, wherein the separator base includes one or more separator materials selected from the group consisting of nonwoven polymers, microporous polymers, track etched materials and papers.

3. The capacitor cell of claim 2, wherein the separator base includes one or more separator materials selected from the group consisting of polyesters, polyethylene, polypropylene, polycarbonate, polytetrafluoroethylene, Kraft paper and Manila paper.

4. The capacitor cell of claim 2, wherein the separator base comprising at least one of a polycarbonate material and a track-etch material.

5. The capacitor cell of claim 1, wherein the separator base has a thickness of approximately 5–250 microns.

6. The capacitor cell of claim 5, wherein the separator base has a thickness of approximately 10–50 microns.

7. The capacitor cell of claim 1, wherein the cathode film includes one or more cathode materials selected from the group: ruthenium, vanadium, copper, sliver, chromium, bismuth, lead, tantalum, titanium, zinc, iron, niobium, zirconium, carbon, manganese and alloys and oxides thereof.

8. The capacitor cell of claim 7, and further wherein the anode film comprises a pressed, sintered and formed, powdered metal anode member disposed on a side of said separator that does not include the cathode film and wherein said anode member comprises a one of the group: lithium, aluminum, sodium, potassium, calcium, magnesium, vanadium, tantalum, niobium, and alloys and oxides thereof.

9. The capacitor cell of claim 1, wherein the cathode film has a thickness of approximately 5–150 microns.

10. The capacitor cell of claim 9, wherein the cathode film has a thickness of approximately 25–40 microns.

11. The capacitor cell of claim 1, wherein the anode film has a thickness of approximately 50–250 microns.

12. The capacitor cell of claim 11, wherein the anode film has a thickness of approximately 90–125 microns.

13. The capacitor cell of claim 1, wherein the capacitor cell is a cylindrical cell.

14. The capacitor cell of claim 1, wherein the capacitor cell is a flat cell.

15. The capacitor cell of claim 14, wherein the one or more metalized separators are folded in a z-fold configuration.

16. The capacitor cell of claim 15 wherein each separator sheet has the one or more cathode materials adjoined to one side of the sheet and the one or more anode materials adjoined to the other side of the sheet.

17. The capacitor cell of claim 1, wherein the one or more metalized separators further include one or more cathode sectors, one or more anode sectors and one or more separator sectors and wherein each of said sectors is spaced-apart from each other.

18. The capacitor cell of claim 17, wherein the one or more cathode sectors include the one or more cathode films, materials for said one or more cathode films selected from the group consisting of ruthenium, vanadium, copper, silver, chromium, bismuth, lead, tantalum, titanium, zinc, iron, niobium, zirconium, carbon, manganese and combinations thereof and the one or more anode sectors include the one or more anode films, materials for said one or more anode films selected from the group consisting of lithium, aluminum, sodium, potassium, calcium, magnesium, vanadium, tantalum, niobium, and alloys and oxides thereof.

19. The capacitor cell of claim 1, wherein the one or more metalized separators are separator segments.

20. The capacitor cell of claim 19, wherein the separator segments include an apron that is substantially free of metal material.

* * * * *